United States Patent
Lambert et al.

(10) Patent No.: US 8,938,736 B2
(45) Date of Patent: Jan. 20, 2015

(54) SYSTEM AND METHOD FOR PROVIDING REDUNDANCY FOR MANAGEMENT CONTROLLER

(75) Inventors: Timothy M. Lambert, Austin, TX (US); Shawn Joel Dube, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1108 days.

(21) Appl. No.: 12/498,490

(22) Filed: Jul. 7, 2009

(65) Prior Publication Data

US 2011/0010706 A1 Jan. 13, 2011

(51) Int. Cl.
G06F 9/455 (2006.01)
G06F 11/00 (2006.01)
G06F 11/14 (2006.01)
G06F 11/20 (2006.01)

(52) U.S. Cl.
CPC ........ *G06F 9/45558* (2013.01); *G06F 11/1484* (2013.01); *G06F 2009/45591* (2013.01); *G06F 11/2038* (2013.01)
USPC .............................................. 718/1; 714/4.11

(58) Field of Classification Search
None
See application file for complete search history.

(56) References Cited

U.S. PATENT DOCUMENTS

| | | | |
|---|---|---|---|
| 6,625,751 B1 * | 9/2003 | Starovic et al. | 714/11 |
| 6,948,008 B2 | 9/2005 | Hawkins et al. | 710/15 |
| 7,337,243 B2 | 2/2008 | Hawkins et al. | 710/14 |
| 7,370,324 B2 * | 5/2008 | Goud et al. | 718/1 |
| 2005/0080887 A1 | 4/2005 | Lee et al. | 709/223 |
| 2007/0234355 A1 * | 10/2007 | Locker et al. | 718/1 |

OTHER PUBLICATIONS

Loveland et al., "Leveraging virtualization to optimize high-availability system configurations," IBM Systems Journal, vol. 47, No. 4, pp. 591-604, 2008.*

* cited by examiner

*Primary Examiner* — Meng An
*Assistant Examiner* — Tammy Lee
(74) *Attorney, Agent, or Firm* — Baker Botts L.L.P.

(57) ABSTRACT

Systems and methods for reducing problems and disadvantages associated with traditional approaches to providing redundancy for a management controller are provided. A method may include executing, by a hypervisor executing on a management controller, a first guest OS and second guest OS. The method may additionally include executing, by the first guest OS, one or more first management applications for managing one or more information handling resources communicatively coupled to the management controller. The second guest OS may: (i) execute one or more second management applications for managing the one or more information handling resources communicatively coupled to the management controller; (ii) execute one or more monitoring applications for monitoring redundancy status of the first guest OS and the second guest OS; (iii) sleeping the one or more second management applications; and (iv) monitoring, by the one or more monitoring applications, the operability of the first guest OS.

16 Claims, 3 Drawing Sheets

SYSTEM AND METHOD FOR PROVIDING REDUNDANCY FOR MANAGEMENT CONTROLLER

TECHNICAL FIELD

The present disclosure relates in general to information handling systems, and more particularly to providing redundancy for a management controller of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The use of management controllers in information handling systems has increased in recent years. Broadly speaking, a management controller may be thought of any device, system, or apparatus configured to facilitate management and control of a collection of information handling resources. For example, a management controller may be utilized in a server chassis to facilitate management and control of individual server blades and shared resources of the chassis (e.g., fans). As another example, a management controller may be utilized in a storage enclosure to facilitate management and control of individual storage resources (e.g., hard disk drives).

During operation of a management controller and/or the various information handling resources it manages, numerous events may occur that may cause the management controller to go "offline," thus potentially leading to unavailability of the managed information handling resources. Such events may include firmware updates, firmware rollbacks, boot processes, user-initiated management controller resets, watchdog timeouts, kernel panic, etc.

Accordingly, to provide high availability of information handling resources, it is often desirable to maintain redundancy for a management controller, in order to prevent downtime. A traditional approach to provide redundancy typically includes the use of a plurality of redundant physical management controllers. However, such a solution is often impractical due to the cost inherent in the inclusion of multiple hardware devices, as well as the complexity associated with such a solution (e.g., the redundant management controllers typically require a complex set of "handshakes" in order to operate effectively).

SUMMARY

In accordance with the teachings of the present disclosure, the disadvantages and problems associated with providing redundancy for management controllers have been reduced or eliminated.

In accordance with embodiments of the present disclosure, a method for providing management redundancy in an information handling system is provided. The method may include executing, by a hypervisor executing on a management controller, a first guest operating system. The method may further include executing, by the hypervisor, a second guest operating system. The method may additionally include executing, by the first guest operating system, one or more first management applications for managing one or more information handling resources communicatively coupled to the management controller. Additionally, the method may include executing, by the second guest operating system, one or more second management applications for managing the one or more information handling resources communicatively coupled to the management controller. Moreover, the method may include executing, by the second guest operating system, one or more monitoring applications for monitoring redundancy status of the first guest operating system and the second guest operating system. The method may further include sleeping, by the second guest operating system, the one or more second management applications. The method may also include monitoring, by the one or more monitoring applications, the operability of the first guest operating system.

In accordance with other embodiments of the present disclosure, an information handling system may include one or more information handling resources and a management controller communicatively coupled to the one or more information handling resources and configured to manage the one or more information handling resources. The management controller may have stored thereon a hypervisor. The hypervisor may be configured to, when executed: (i) execute a first guest operating system, the first guest operating system configured to execute one or more first management applications for managing the one or more information handling resources; and (ii) execute a second guest operating system. The second guest operating system configured to: (a) execute one or more second management applications for managing the one or more information handling resources; (b) execute one or more monitoring applications for monitoring redundancy status of the first guest operating system and the second guest operating system; (c) sleep the one or more second management applications; and (d) monitor the operability of the first guest operating system.

In accordance with further embodiments of the present disclosure, a management controller configured to manage one or more information handling resources may include stored thereon on a hypervisor. The hypervisor may be configured to, when executed: (i) execute a first guest operating system, the first guest operating system configured to execute one or more first management applications for managing the one or more information handling resources; and (ii) execute a second guest operating system, the second guest operating system. The second guest operating system may be configured to, when executed: (a) execute one or more second management applications for managing the one or more information handling resources; (b) execute one or more monitoring applications for monitoring redundancy status of the first guest operating system and the second guest operating system; (c) sleep the one or more second management applications; and (d) monitor the operability of the first guest operating system.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
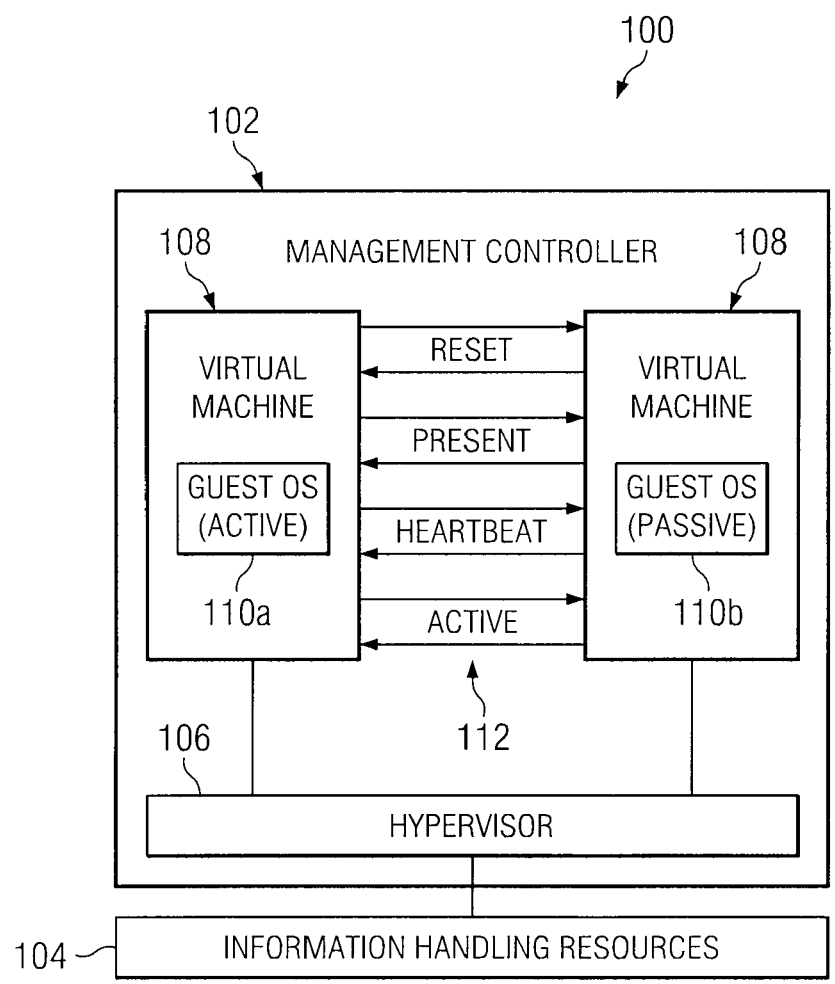
FIG. 1 illustrates a block diagram of an example information handling system, in accordance with certain embodiments of the present disclosure.
Figure 2:
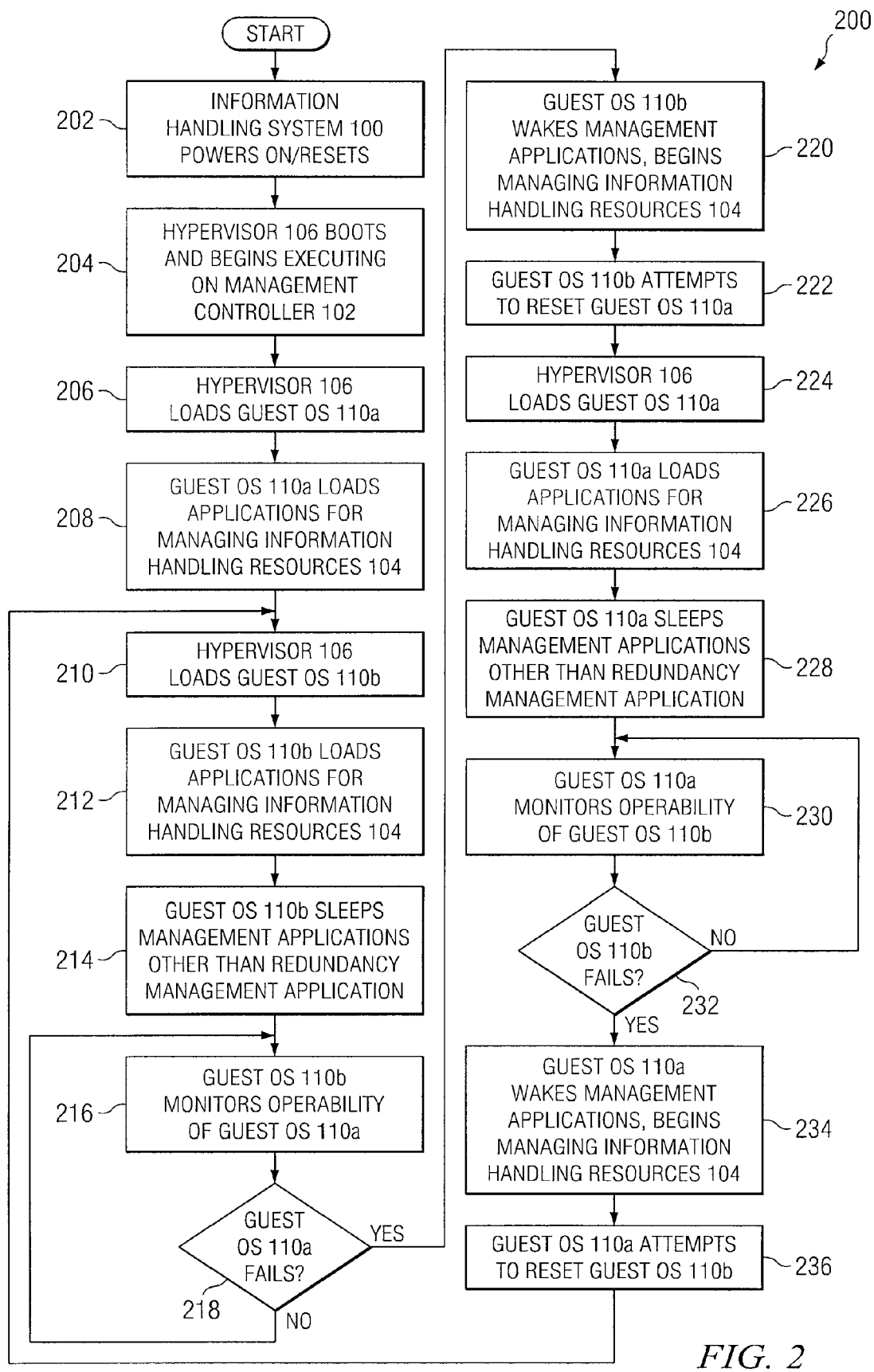
FIG. 2 illustrates a flow chart of an example method for providing redundancy, in accordance with certain embodiments of the present disclosure.
Figure 3:
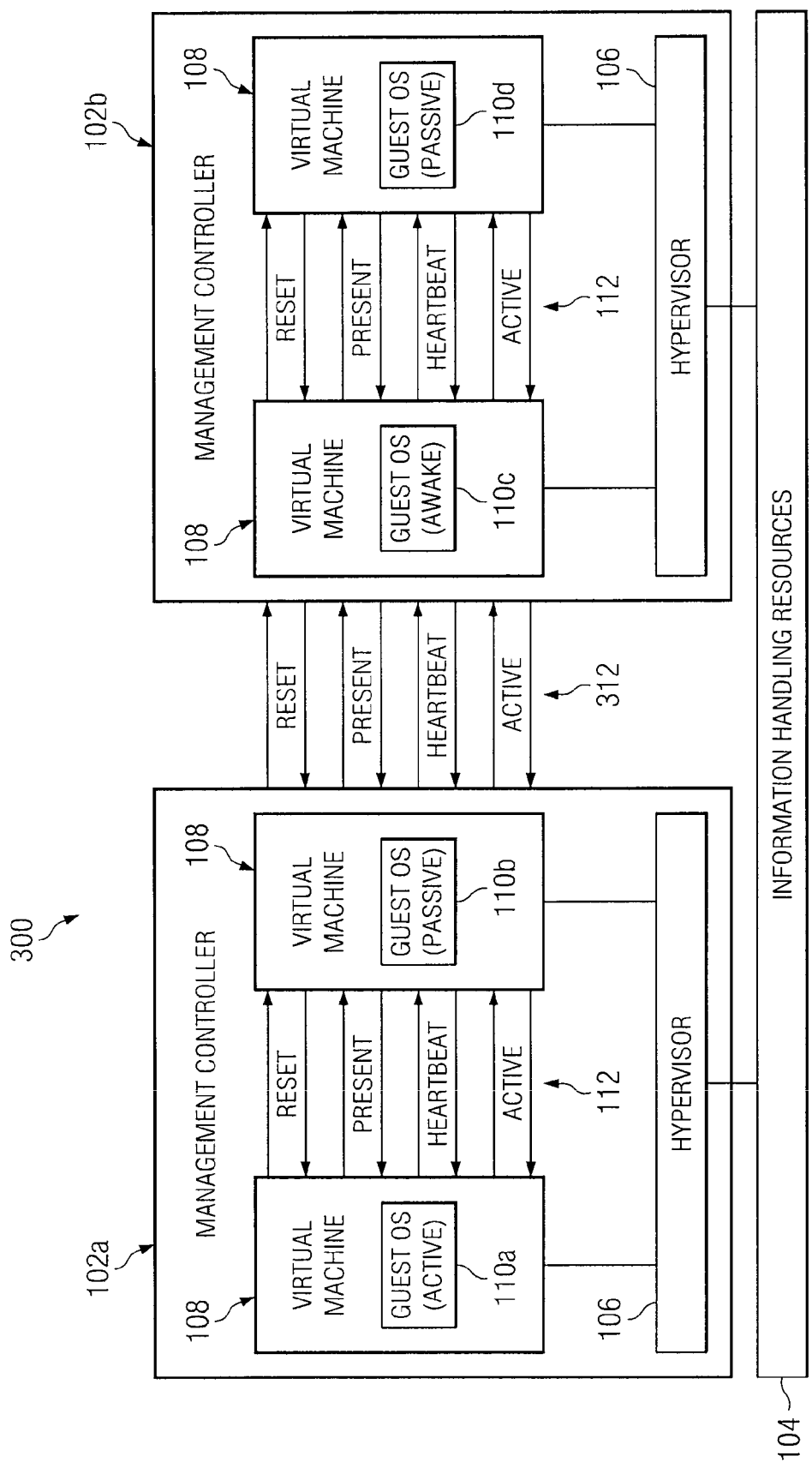
FIG. 3 illustrates a block diagram of another example information handling system, in accordance with certain embodiments of the present disclosure.

Preferred embodiments and their advantages are best understood by reference to FIGS. 1-3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, busses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates a block diagram of an example information handling system 100, in accordance with certain embodiments of the present disclosure. In certain embodiments, information handling system 100 may comprise a computer chassis or enclosure (e.g., a server chassis holding one or more server blades). In other embodiments, information handling system 100 may comprise a storage enclosure. In yet other embodiments, information handling system 100 may be a personal computer (e.g., a desktop computer or a portable computer). As depicted in FIG. 1, information handling system 100 may include a management controller 102 coupled to one or more information handling resources 104.

Management controller 102 may be any system, device, or apparatus configured to facilitate management and/or control of information handling system 100 and its component information handling resources 104. For example, in certain embodiments, management controller 102 may include or be an integral part of an access controller that may permit an administrator or other person to remotely monitor and/or remotely manage information handling system 100 (e.g., via an information handling system remotely connected to information handling system 100 via a network) regardless of whether information handling system 100 is powered on and/or has an operating system installed thereon. In such embodiments, management controller 102 may allow for "out-of-band" control of information handling system 100, such that communications to and from management controller 102 are communicated via a management channel physically isolated from the "in band" communication with a standard network interface of information handling system 100. In these embodiments (i.e., embodiments where management controller 102 may include or be an integral part of an access controller), management controller 102 may include or may be an integral part of a Dell Remote Access Controller (DRAC) or an Integrated Dell Remote Access Controller (iDRAC). In addition, in such embodiments, management controller 102 may allow an administrator to remotely manage one or more parameters associated with operation of information handling system 100 (e.g., power usage, processor allocation, memory allocation, security privileges, etc.).

In other embodiments, management controller 102 may include or be an integral part of a baseboard management controller (BMC). In such embodiments, management controller 102 may manage the interface between system management software and platform hardware using any suitable protocol and/or standard, including, without limitation, the Intelligent Platform Management Interface (IPMI) architecture. In these embodiments (i.e., embodiments where management controller 102 may include or be an integral part of a BMC), different types of sensors built into information handling system 100 or its component information handling resources 104 may report to management controller 102 regarding parameters such as temperature, cooling fan speeds, power mode, operating system (OS) status, etc. Accordingly, management controller 102 may monitor the sensors and may communicate alerts to a system administrator via a network or other means if any of the parameters associated with the sensors vary from preset limits or thresholds, indicating a potential failure of the system. The administrator may also remotely communicate with management controller 102 to take some corrective action such as, for example, resetting or power cycling information handling system 100 or one or more of its component information handling resources 104 to cause a stalled operating system to run again.

In yet other embodiments, management controller 102 may include or be an integral part of a chassis management controller (CMC). In such embodiments, management controller 102 may be communicatively coupled to one or more information handling resources 104 of information handling system 100 (e.g. blades and power supply units) and/or may include any system, device or apparatus operable to monitor the power requirements of and control the operation of components of information handling system 100. In these embodiments (i.e., embodiments where management controller 102 may include or be an integral part of a CMC), management controller 102 may be configured to determine the power requirements of the various components of information handling system 100 and/or may be configured to manage one or more power supply units such that the power supply units provide the power required by the various components of information handling system 100 (e.g., bringing appropriate power supply units online or offline, and/or controlling the power delivered by each of the power supply units).

In other embodiments, management controller 102 may include or be an integral part of a storage enclosure controller. In such embodiments, management controller 102 may be communicatively coupled to one or more storage resources of information handling system 100 (e.g., hard disk drives) and/or may include any system, device or apparatus operable to monitor the power requirements of and control the operation of such storage resources. In these embodiments (i.e., embodiments where management controller 102 may include or be an integral part of a storage enclosure controller), storage enclosure controller 115 may also provide functionality including, without limitation, input/output routing, and error detection and recovery.

Although not depicted in FIG. 1, management controller 102 may include or be an integral part of any suitable components (e.g., processor, memory, storage resources) that allow management controller 102 to carry out the functionality described herein. In addition, as depicted in FIG. 1, management controller 102 may include hypervisor 106 and one or more virtual machines 108 executing thereon (e.g., executing on a processor of management controller 102).

Hypervisor 106 may comprise software and/or firmware generally operable to allow multiple operating systems to run on a single information handling system (e.g., information handling system 100) at the same time. This operability is generally allowed via virtualization, a technique for hiding the physical characteristics of information handling system resources from the way in which other systems, applications, or end users interact with those resources. Hypervisor 106 may be one of a variety of proprietary and/or commercially available virtualization platforms, including without limitation, VIRTUALLOGIX VLX FOR EMBEDDED SYSTEMS, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP.

In one embodiment, hypervisor 106 may comprise a specially designed operating system (OS) with native virtualization capabilities. In another embodiment, hypervisor 106 may comprise a standard OS with an incorporated virtualization component for performing virtualization.

In another embodiment, hypervisor 106 may comprise a standard OS running alongside a separate virtualization application. In this embodiment, the virtualization application of hypervisor 106 may be an application running above the OS and interacting with information handling resources 104 only through the OS. Alternatively, the virtualization application of hypervisor 106 may, on some levels, interact indirectly with information handling resources 104 via the OS, and, on other levels, interact directly with information handling resources 104 (e.g., similar to the way the OS interacts directly with information handling resources 104, or as firmware running on information handling resources 104). As a further alternative, the virtualization application of hypervisor 106 may, on all levels, interact directly with information handling resources 104 (e.g., similar to the way the OS interacts directly with information handling resources 104, or as firmware running on information handling resources 104) without utilizing the OS, although still interacting with the OS to coordinate use of information handling resources 104.

To allow multiple operating systems to run on information handling system 100 at the same time, hypervisor 106 may virtualize the hardware resources of information handling resources 104 and present virtualized computer hardware representations to each of virtual machines 108. In other words, hypervisor 104 may assign to each of virtual machines 108, for example, one or more processors, one or more regions of memory in a memory subsystem, one or more components of an I/O subsystem, one or more other components of information handling resources 104, etc. The virtualized hardware representation presented to each of virtual machines 108 may comprise a mutually exclusive, or non-overlapping, set of hardware resources per virtual machine (e.g., no hardware resources are shared between virtual machines) or may comprise an overlapping set of hardware resources per virtual machine (e.g., one or more hardware resources may be shared by two or more virtual machines).

In one embodiment, hypervisor 106 may assign hardware resources of information handling resources 104 statically (i.e., certain hardware resources are assigned to certain virtual machines, and this assignment does not vary over time). Additionally or alternatively, hypervisor 106 may assign hardware resources of information handling resources 104 dynamically (i.e., the assignment of hardware resources to virtual machines varies over time, for example, in accordance with the specific needs of the applications running on the individual virtual machines). Additionally or alternatively, hypervisor 106 may keep track of the hardware-resource-to-virtual-machine mapping, such that hypervisor 106 is able to determine the virtual machines to which any given hardware resource of information handling resources 104 has been assigned.

Each of virtual machines 108 may include a guest operating system (guest OS) 110, along with any applications or other software running on guest OS 110. Each guest OS 110 may be any OS compatible with and/or supported by hypervisor 106 (even if guest OS is generally incompatible with information handling resources 104). In addition, each guest OS 110 may be a separate instance of the same operating system or an instance of different operating systems. For example, in one embodiment, each guest OS 110 may comprise a LINUX OS. As another example, guest OS 110a may comprise a LINUX OS and guest OS 110b may comprise a VXWORKS OS. Although information handling system 100 is depicted as having two virtual machines 108, any number of virtual machines may be running on information handling system 100 at any given time.

Hypervisor 106 may virtualize the hardware resources of information handling resources 104 and present virtualized computer hardware representations to each of virtual machines 108. Each guest OS 110 of virtual machines 108 may then begin to operate and run applications and/or other software. While operating, each guest OS 110 may utilize one or more hardware resources of information handling resources 104 assigned to the respective virtual machine by hypervisor 106.

Information handling resources 104 may be communicatively coupled to management controller 102 and may include any component system, device or apparatus of an information handling system, including without limitation processors, busses, memories, input-output devices and/or interfaces, storage resources, network interfaces, motherboards, electromechanical devices (e.g., fans), displays, and power supplies.

In operation, guest OS 110a may operate in an "active" mode, and guest OS 110b may operate in a "passive" or "standby" mode, as depicted in FIG. 1, in order to provide redundancy in management controller 102. Hypervisor 106 may assign hardware resources of information handling resources 104 predominantly to active guest OS 110a, while hypervisor 106 may assign limited hardware resources of information handling resources 104 to passive guest OS 110b. For example, hypervisor 106 may assign only those hardware resources of information handling resources 104 to passive guest OS 110b to allow guest OS 110b to maintain rudimentary functions such as redundancy control and/or monitoring processes while predominantly sleeping all major processes. In addition, rather than hardware handshakes required between redundant management controllers of traditional approaches, the redundant guest OSs 110 may communicate between virtual handshakes 112, which may be virtualized via a shared memory location. In FIG. 1, handshakes ACTIVE, PRESENT, HEARTBEAT, and RESET are shown as examples. However, other suitable handshakes 112 may be used. Additionally, upon an occurrence of an event causing a failure or reset of active guest OS 110a, passive guest OS 110b may become active and obtain operational parameters (e.g., thermal algorithm states, power management states, etc.) from formerly-active guest OS 110a, for example, by having hypervisor 106 provide now-active guest OS 110b with access to memory previously accessible to guest OS 110a wherein such parameters are stored.

FIG. 2 illustrates a flow chart of an example method 200 for providing redundancy, in accordance with certain embodiments of the present disclosure. According to one embodiment, method 200 may begin at step 202. As noted above, teachings of the present disclosure may be implemented in a variety of configurations of system 100. As such, the preferred initialization point for method 200 and the order of the steps 202-236 comprising method 200 may depend on the implementation chosen.

At step 202, information handling system 100 may be powered on or reset. Accordingly, at step 204, hypervisor 106 may boot and begin executing on management controller 102.

At step 206, hypervisor 106 may load guest OS 110a. At step 208, guest OS 110a may load applications for managing information handling resources 104, and may begin managing information handling resources 104.

At step 210, hypervisor 106 may load guest OS 110b. At step 212, guest OS 110b may load applications for managing information handling resources 104. At step 214, guest OS 110b may sleep management applications other than a redundancy management application configured to monitor guest OS 110a to ensure redundancy is maintained.

At step 216, the redundancy management application of guest OS 110b may monitor the operability of guest OS 110a. At step 218, the redundancy management application may determine if guest OS 110a has failed (e.g., guest OS 110a has been reset, has stalled, or has experienced another event that compromises guest OS 110a's ability to manage information handling resources 104). The failure of guest OS 110a may be detected by guest OS 110b in any suitable manner. For example, the redundancy management application of guest 110b may monitor virtual handshakes 112 to determine if a failure is indicated (e.g., any of the ACTIVE, PRESENT, or HEARTBEAT handshakes are deasserted, or if the RESET handshake is asserted indicating a reset of guest OS 110a). Until guest OS 110a experiences a failure, method 200 may repeat steps 216 and 218. However, if guest OS 110a fails, method 200 may proceed to step 220.

At step 220, in response to the failure of guest OS 110a, guest OS 110b may wake the sleeping management applications executing thereon, and begin managing information handling resources 104. At step 222, guest OS 110b may attempt to reset guest OS 110a, so that redundancy may again be achieved. Guest 110b may attempt to reset guest OS 110a in any suitable manner. For example, guest 110b may communicate a message or instruction to hypervisor 106 requesting it to reinstantiate guest OS 110a.

At step 224, hypervisor 106 may load guest OS 110a. At step 226, guest OS 110a may load applications for managing information handling resources 104. At step 228, guest OS 110a may sleep management applications other than a redundancy management application configured to monitor guest OS 110b to ensure redundancy is maintained.

At step 230, the redundancy management application of guest OS 110a may monitor the operability of guest OS 110b. At step 232, the redundancy management application may determine if guest OS 110b has failed (e.g., guest OS 110b has been reset, has stalled, or has experienced another event that compromises guest OS 110b's ability to manage information handling resources 104). The failure of guest OS 110b may be detected by guest OS 110a in any suitable manner. For example, the redundancy management application of guest 110a may monitor virtual handshakes 112 to determine if a failure is indicated (e.g., any of the ACTIVE, PRESENT, or HEARTBEAT handshakes are deasserted, or if the RESET handshake is asserted indicating a reset of guest OS 110b). Until guest OS 110b experiences a failure, method 200 may repeat steps 230 and 232. However, if guest OS 110b fails, method 200 may proceed to step 234.

At step 234, in response to the failure of guest OS 110b, guest OS 110a may wake the sleeping management applications executing thereon, and begin managing information handling resources 104. At step 236, guest OS 110a may attempt to reset guest OS 110b, so that redundancy may again be achieved. Guest 110a may attempt to reset guest OS 110b in any suitable manner. For example, guest 110a may communicate a message or instruction to hypervisor 106 requesting it to reinstantiate guest OS 110b. After completion of step 236, method 200 may proceed again to step 210.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 100 or any other system operable to implement method 200. In certain embodiments, method 200 may be implemented partially or fully in software and/or firmware embodied in computer-readable media.

FIG. 3 illustrates a block diagram of another example information handling system 300, in accordance with certain embodiments of the present disclosure. As depicted in FIG. 3, information handling system 300 utilizes a concurrent software redundancy and hardware redundancy scheme, in that information handling system 300 includes redundant management controllers 102, and each management controller 102 includes an active or awake guest OS 110a, 110c and a redundant passive guest OS 110b, 110d, similar to that described above with reference to FIGS. 1 and 2. Although not shown, in some embodiments of information handling system 300, physical isolation devices may be present between information handling resources 104 and hypervisors 106.

Accordingly, management controller 102b may be made active in the event of a hardware failure of management controller 102a, while management controller 102a may remain active and failover from guest OS 110a to guest OS 110b in the event of a software failure of guest OS 110b. Redundancy management between guest operating systems 110 within the same management controller 102 may be managed via virtual handshakes 112 (e.g., using common memory locations or registers for handshake signals), and redundancy management between management controllers 102 may be managed via physical handshakes 312 (e.g., using signals communicated between management controllers 102 via physical pins coupled to management controllers 102).

Thus, while the use multiple traditional redundant management controllers may not be prevalent due to costs and complexity, the arrangement depicted in FIG. 3 may reduce the hardware complexity required for handshaking protocol between the management controllers (e.g., physical handshakes 312 via signals communicated via input/output pins between management controllers), as the types of events that cause failover between management controllers may be smaller as compared to traditional approaches.

Using the methods and systems disclosed herein, problems associated with conventional approaches to providing management controller redundancy of an information handling system may be improved, reduced, or eliminated. For example, the methods and systems disclosed herein provide for system management redundancy within a single management controller with no significant added hardware required for a significant portion of events, errors, and image management scenarios (e.g., firmware upgrades, firmware rollbacks) that may lead to management downtime. In addition, in embodiments where physical redundancy is used, the methods and systems described herein may provide extensibility to further enhance such embodiments. In addition, because redundancy is provided using a guest OS that is executing in a near-idle state, the methods and systems described herein may permit redundancy without imposing a significant degradation of performance.

Although the present disclosure has been described in detail, it should be understood that various changes, substitutions, and alterations can be made hereto without departing from the spirit and the scope of the disclosure as defined by the appended claims.

What is claimed is:

1. A method for providing management redundancy in an information handling system, comprising:

loading, by a hypervisor executing on a processor of a management controller, a first guest operating system;

loading, by the hypervisor, a second guest operating system;

loading, by the first guest operating system, one or more first management applications for managing one or more information handling resources communicatively coupled to the management controller;

loading, by the second guest operating system, one or more second management applications for managing the one or more information handling resources communicatively coupled to the management controller;

loading, by the second guest operating system, one or more redundancy monitoring applications for monitoring operability of the first guest operating system and the second guest operating system;

after loading the one or more second management applications, sleeping, by the second guest operating system, the one or more second management applications;

monitoring, by the one or more redundancy monitoring applications, the operability of the first guest operating system;

waking, by the second guest operating system, the one or more second management applications, in response to an occurrence of an event related to the first guest operating system;

providing to the second guest operating system, by the hypervisor, access to a memory where an operational parameter of the first guest operating system is stored; and resetting, by the second quest operating system, the first quest operating system, in response to the occurrence of the event.

2. A method according to claim 1, further comprising re-loading, by the hypervisor, the first guest operating system, in response to the occurrence of the event.

3. A method according to claim 2, further comprising:

re-loading, by the re-loaded first guest operating system, the one or more first management applications; and after re-loading the one or more first management applications, sleeping, by the re-loaded first guest operating system, the one or more first management applications.

4. A method according to claim 2, further comprising loading, by the re-loaded first guest operating system, one or more redundancy monitoring applications for monitoring operability of the first guest operating system and the second guest operating system; and monitoring, by the one or more redundancy monitoring applications loaded by the re-loaded first guest operating system, the operability of the second guest operating system.

5. A method according to claim 1, wherein the first guest operating system and the second guest operating system are the same operating system.

6. A method according to claim 1, wherein the one or more first management applications are the same as the one or more second management applications.

7. An information handling system, comprising:

one or more information handling resources; and a management controller communicatively coupled to the one or more information handling resources and configured to manage the one or more information handling resources, the management controller comprising:

a processor;

a computer readable medium communicatively coupled to the processor; and computer-executable instructions encoded in the computer readable medium, the instructions comprising a hypervisor configured to, when executed by the processor:

load a first guest operating system, the first guest operating system configured to load one or more first management applications for managing the one or more information handling resources; and load a second guest operating system, the second guest operating system configured to:

load one or more second management applications for managing the one or more information handling resources;

load one or more redundancy monitoring applications for monitoring operability of the first guest operating system and the second guest operating system;

after loading the one or more second management applications, sleep the one or more second management applications;

monitor the operability of the first guest operating system;

wake the one or more second management applications in response to an occurrence of an event related to the first guest operating system;

obtain, from the hypervisor, access to a memory where an operational parameter of the first guest operating system is stored; and reset the first quest operating system in response to the occurrence of the event.

8. An information handling system according to claim 7, further comprising the hypervisor configured to re-load the first guest operating system in response to the occurrence of the event.

9. An information handling system according to claim 8, further comprising the re-loaded first guest operating system configured to:

re-load the one or more first management applications; and after re-loading the one or more first management applications, sleep the one or more first management applications.

10. An information handling system according to claim 8, further comprising the re-loaded first guest operating system configured to:

load one or more redundancy monitoring applications for monitoring operability of the first guest operating system and the second guest operating system; and monitor, by the one or more redundancy monitoring applications loaded by the re-loaded first guest operating system, the operability of the second guest operating system.

11. An information handling system according to claim 7, wherein the first guest operating system and the second guest operating system are the same operating system.

12. An information handling system according to claim 7, further comprising a second management controller communicatively coupled to the one or more information handling resources and the management controller and configured to manage the one or more information handling resources, the second management controller having stored thereon a second hypervisor, the second hypervisor configured to, when executed:

load a third guest operating system, the third guest operating system configured to:

load one or more third management applications for managing the one or more information handling resources;

load one or more second redundancy monitoring applications for monitoring operability of the management controller and the second management controller;

after loading the one or more third management applications, sleep the one or more third management applications; and monitor the operability of the management controller; and load a fourth guest operating system, the fourth guest operating system configured to:

load one or more fourth management applications for managing the one or more information handling resources;

load one or more third redundancy monitoring applications for monitoring operability of the third guest operating system and the fourth guest operating system;

after loading the one or more fourth management applications, sleep the one or more fourth management applications; and monitor the operability of the third guest operating system.

13. An information handling system according to claim 7, wherein the one or more first management applications are the same as the one or more second management applications.

14. A management controller configured to manage one or more information handling resources, the management controller comprising:

a processor;

a computer readable medium communicatively coupled to the processor; and computer-executable instructions encoded in the computer readable medium, the instructions comprising a hypervisor configured to, when executed by the processor:

load a first guest operating system, the first guest operating system configured to load one or more first management applications for managing the one or more information handling resources; and load a second guest operating system, the second guest operating system configured to:

load one or more second management applications for managing the one or more information handling resources;

load one or more redundancy monitoring applications for monitoring operability of the first guest operating system and the second guest operating system;

after loading the one or more second management applications, sleep the one or more second management applications; and monitor the operability of the first guest operating system;

wake the one or more second management applications in response to an occurrence of an event related to the first guest operating system;

obtain, from the hypervisor, access to a memory where the operational parameters of the first guest operating system is stored; and reset the first guest operating system in response to the occurrence of the event.

15. A management controller according to claim 14, further comprising the hypervisor configured to re-load the first guest operating system in response to the occurrence of the event.

16. A management controller according to claim 15, further comprising the re-loaded first guest operating system configured to:

re-load the one or more first management applications;

after re-loading the one or more first management applications, sleep the one or more first management applications;
load one or more redundancy monitoring applications for monitoring operability of the first guest operating system and the second guest operating system; and
monitor the operability of the second guest operating system.

\* \* \* \* \*